United States Patent
Cheng et al.

(10) Patent No.: US 6,191,214 B1
(45) Date of Patent: Feb. 20, 2001

(54) METHOD FOR THE PREPARATION OF WATER-BORNE POLYURETHANE ADHESIVE

(75) Inventors: Kun Lin Cheng; Wen-Tung Chen, both of Tu-Cheng (TW)

(73) Assignee: China Textile Institute, Taipei Hsien (TW)

( * ) Notice: Under 35 U.S.C. 154(b), the term of this patent shall be extended for 0 days.

(21) Appl. No.: 09/354,301

(22) Filed: Jul. 16, 1999

(51) Int. Cl.[7] ............................... C08J 3/00; C08K 3/20; C08L 75/00

(52) U.S. Cl. ........................ 524/591; 524/839; 524/840

(58) Field of Search .................................... 524/591, 839, 524/840

Primary Examiner—Patrick D. Niland
(74) Attorney, Agent, or Firm—Rosenberg, Klein & Lee

(57) ABSTRACT

The present invention consists of a method for the preparation of an anionic water dispersible polyurethane(PU), which has excellent adhesive properties. The preparation method involves the formation of prepolymer from polyisocyanates and an active hydrogen containing compound such as polyols, followed by chain extension with aliphatic diols or diamines, and finally by chain extension with N-(2-aminoalkyl-2-aminoethoxylate ethane sulfonate and dispersion of the reaction product by deionized water to obtain water-borne polyurethane adhesive.

3 Claims, No Drawings

METHOD FOR THE PREPARATION OF WATER-BORNE POLYURETHANE ADHESIVE

FIELD OF THE INVENTION

This invention is a method for the preparation of water-borne PU dispersion for adhesive, in particular, for an anionic water dispersible polyurethane containing sulfonate group.

BACKGROUND OF THE INVENTION

Water dispersible PU resins containing sulfonate group have been described in many patents, including:

(a) Use of sodium salt of N-(2-aminoethyl)-2-aminoethane sulfonic acid for the chain extender and emulsifier of water-borne PU resins, reported by the Bayer AG of Germany in following patents:
Ger. Offen. 2804609
Ger. Offen. 2900574
Ger. Offen. DE 3216567
Ger. Offen. DE 3415290
Ger. Offen. DE 3603996
Ger. Offen. DE 3630045

(b) Use of sulfonate of diols as one of the raw materials in preparing water-borne PU resins by the Bayer AG as reported in following patents:
U.S. Pat. No. 4056564
U.S. Pat. No. 4108814
Ger. Offen. 2446440

(c) In the Patent PCT/US95/00030, 5-sulfoisophthalic acid monosodium salt is used as raw material to synthesize water-borne PU adhesive with high green When water-borne PU adhesive is coated on the substrate as rubber, metals or PVC, water shall be driven off first by heating followed by thermal activation of the adhesive layer to perform bonding. In case the formulation of water-borne PU is not appropriate to cause higher activation temperature and damage the substrate. The method to lower the activation temperature through the use of more solvent, plasticizer or other resin shall lead to significant loss of heat strength.

Besides, in actual use of water-borne PU for adhesive, the operation aspect should be considered to avoid very short tack time in practice. The extension of tack time is an important topic in the use of water-borne PU resin.

In order to improve the activation temperature and tack time during the use of water borne PU for adhesive, this invention introduces the use of ethylene oxide sulfonates in the side chain of water borne PU molecules to form excellent bonding of said water borne PU with improved activation temperature and tack time.

According to the present invention, the structure of diamine sulfonates is shown as following:

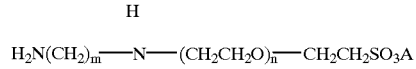 (1)

in which
m=2~12
n=1~3
A=K or Na.

In the use of diamine sulfonates of this invention, the acetone process, as described in Ger. Off. 1495745 and 1495247, can be applied, to add acetone to dissolve the pre-polymer after its formation, followed by chain extension with aliphatic diol or diamine with dispersion of water to obtain water borne PU resin with high molecular weight, after completing the reaction, acetone can then be removed by distillation under reduced pressure.

In the synthesis of water-borne PU for adhesive, the raw materials include:

(I) Diisocyanates with the general formula

in which Q=aliphatic hydrocarbon radical with 4~12 carbon or =cycloaliphatic hydrocarbon radical with 6~15 carbon or =araliphatic hydrocarbon radical with 7~15 carbon.

These diisocyanates include
tetramethylene diisocyanate
hexamethylene diisocyanate (HDI)
1,4- diisocyanatocyclohexane
4,4'- diisocyanatodicyclohexylmetlhane ($H_{12}$MDI)
isophorone diisocyanate (IPDI)
tetramethylxylylene diisocyanate (TMXDI)
diphenylmethane-4,4'- diisocyanate(MDI)
toluylene diisocyanate (TDI)
xylylene diisocyanate (XDI)
mixture of above diisocyanates The molar ratio of diisocyanates to polyols (abbreviated as NCO/OH) is from 1.1:1 to 10:1, most preferably, from 1.2:1 to 2.5:1.

(II) The molecular weight of polyester polyols is in the range from 400 to 10,000, most preferably from 400 to 4,000, the preparation of these polyester polyols is by condensation of dibasic carboxylic acid with excess dihydric alcohols, the required dibasic acids include
adipic acid
phthalic acid
tetrahydrophthalic acid
hexahydrophthalic acid The glycols or polyols having molecular weight in the range of 60~400 include:
ethylene glycol
propylene glycol
butylene glycol
hexamethylene glycol
glycerol
trimethylol propane
diethylene glycol
triethylene glycol
tetraethylene glycol The polyether polyols include:
polytetramethylene glycol( PTMG)
polypropylene glycol(PPG)
polyethylene glycol (PEG)

Other polyols include polycarbonate polyol, polycaprolactone or the mixture of above polyols.

(III) Amine chain extenders having molecular weight between 30 to 440 include:
ethylene diamine
hexamethylene diamine
isophorone diamine
2,4-diaminotoluene
4,4'-diaminodicyclohexylmethane
diethylene triamine triethylene tetraamine hydrazine hydrazine hydrate.

(IV) Glycol chain extenders having molecular weight between 60~400 such as ethylene glycol and butylene glycol are used.

(V) Chain extenders and emulsifyers containing sulfonate with following structure:

(1)

in which m=2~12 n=1~3

A=K or Na.

By introducing above sulfonates to the main chain of PU, the amount is for each 100 g of polymer with 5~200 milliequivalent of said slfonate for dispersion in water.

The reaction temperature for preparing prepolymer in general is between 5~160° C., most preferably between 50~120° C. The reaction temperature for chain extension in general is between 20~100° C., most preferably between 20~80° C. The removal of solvent as acetone in general is by distillation under reduced pressure, the temperature to be controlled between 20~100° C., most preferably between 30~90° C. The pressure is controlled between 5~1100 mbar, most preferably between 10~300 mbar.

The water-borne PU resin in this invention has good stability in forming emulsion, to be used as adhesive with better activation temperature and tack time.

The embodiment of this invention is illustrated as following:

EXAMPLE 1

| | |
|---|---|
| Polybutylene adipate (PBA, OH Number 56) | 320 g |
| Hexamethylene diisocyanate (HDI) | 23.3 g |
| Isophorone diisocyanate (IPDI) | 15.4 g |
| Hydrazine monohydrate | 0.8 g |
| Acetone | 350 g |
| Diamine sulfonate (1) wherein m = 2, n = 1 with 45% in water | 16.64 g |

Polymerization method:

The polyol is first distilled under vacuum at 120° C. for 30 minutes, then lowered to 90° C. for addition of HDI and IPDI with stirring for 3 hours. Acetone is then added slowly to maintain temperature at 50° C. Hydrazine monohydrate and water solution of diamine sulfonate are added to the reactor. After 15 minutes, the mixture is dispersed with deionized water and distilled under reduced pressure to remove acetone. A water-borne PU dispersion with solid content of 47%, viscosity 1200 cps and pH of 7.3 can be obtained.

EXAMPLE 2

| | |
|---|---|
| Polybutylene adipate (PBA, OH Number 56) | 300 g |
| Polyethylene glycol (PEG) | 8 g |
| Trimethylol propane | 0.5 g |
| 2,2'-Dimethylpropionic acid (DMPA) | 0.8 g |
| HDI | 22.1 g |
| IPDI | 15.0 g |
| Acetone | 400 g |
| 1,4-Butane diol | 3.24 g |
| Diamine sulfonate (1) wherein m = 2, n = 1 with 45% in water | 16.8 g |

Polymerization method:

As in Example 1 for reaction, a water-borne PU dispersion with solid content of 46.8%, viscosity 1050 cps and pH of 7.4 can be obtained.

In Example 1, the obtained water-borne PU resin after coating to PVC sheet, the activation temperature was found to be 50° C. with tack time of 4.5 minutes. In Example 2, with same PVC sheet as substrate, the activation temperature was found to be 55° C. with tack time of 4 minutes. Thus, by using the preparative method for water-borne PU emulsion with pH around 7, its activation temperature is between 50~55° C. with tack time above 4 minutes.

What is claimed is:

1. A method for the preparation of water-borne PU dispersion for adhesive, wherein the main reactants comprise:

(a) organic isocyanates selected from the group consisting of aliphatic isocyanates, aromatic isocyanates, alicyclic isocyanates or a mixture thereof;

(b) polyols for reaction with said isocyanates said polyols being selected from the group consisting of polyester polyols, polyether polyols, polycarbonate polyols, polycaprolactone polyols or a mixture thereof;

(c) chain extenders from diamines or glycols with a molecular weight between 30–400;

(d) compounds containing diamine sulfonate as:

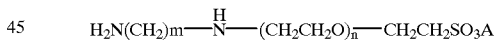

in which m=2–12 n=1–3

A=K or Na.

2. The method as recited in claim 1 wherein a molar ratio of diisocyanate to polyol, NCO/OH, is from 1.1:1 to 10:1.

3. The method as recited in claim 1, wherein a molar ratio of diisocyanate to polyol, NCO/OH, is between 1.2:1 to 2.5:1.

* * * * *